(12) United States Patent
MacKnight

(10) Patent No.: US 7,252,703 B2
(45) Date of Patent: Aug. 7, 2007

(54) DIRECT CONTACT LIQUID AIR CONTAMINANT CONTROL SYSTEM

(75) Inventor: Al MacKnight, Lakewood, CA (US)

(73) Assignee: Honeywell International, Inc., Morristown, NJ (US)

( * ) Notice: Subject to any disclaimer, the term of this patent is extended or adjusted under 35 U.S.C. 154(b) by 753 days.

(21) Appl. No.: 10/611,490

(22) Filed: Jun. 30, 2003

(65) Prior Publication Data

US 2004/0265199 A1    Dec. 30, 2004

(51) Int. Cl.
C01B 1/26 (2006.01)
C01B 17/00 (2006.01)
B01D 53/04 (2006.01)
B01D 53/34 (2006.01)
B01D 45/00 (2006.01)
B01D 19/00 (2006.01)
F04D 1/14 (2006.01)

(52) U.S. Cl. .............................. 95/218; 95/261; 95/248; 95/223; 95/9; 96/281; 96/282; 96/286; 96/228; 415/89; 423/242; 423/215.5; 423/238; 55/345; 55/457; 55/59; 55/72

(58) Field of Classification Search ................ 95/218, 95/221, 236, 221.2, 36; 96/281, 282, 286, 96/228–230
See application file for complete search history.

(56) References Cited

U.S. PATENT DOCUMENTS

| 3,632,519 A | | 1/1972 | Gustafson |
| 3,727,375 A | | 4/1973 | Wallace |
| 3,852,409 A | * | 12/1974 | Martin et al. .......... 423/243.08 |
| 3,969,094 A | * | 7/1976 | Dunson et al. ............... 96/228 |
| 3,977,810 A | * | 8/1976 | Erickson et al. .............. 415/89 |
| 4,285,918 A | * | 8/1981 | Gustafson .................. 423/228 |
| 4,375,975 A | | 3/1983 | McNicholas |
| 4,468,234 A | * | 8/1984 | McNicholas ................. 95/270 |
| 4,810,266 A | | 3/1989 | Zinnen et al. |
| 5,318,758 A | * | 6/1994 | Fujii et al. .................. 423/228 |
| 5,876,486 A | | 3/1999 | Steinwandel et al. |
| 6,132,493 A | | 10/2000 | Church |
| 6,190,629 B1 | * | 2/2001 | Solomon et al. ............ 423/238 |
| 6,364,940 B1 | * | 4/2002 | Prueter et al. ................ 95/261 |

FOREIGN PATENT DOCUMENTS

| EP | 1204193 A | 12/1986 |
| EP | 1201290 A | 5/2002 |
| GB | 1011045 A | 11/1965 |

OTHER PUBLICATIONS

"Unit Operations for Chemical Engineering", McCabe, p. 571.*
Barabash, P.A. et al., "*The Centrifugal Mass Exchange Apparatus in Air-Conditioning System of Isolated, Inhabited Object and Its Work Control*", in Proceedings of the 4th European Symposium on Space Environmental and Control Systems, Oct. 21-24, 1991.
International Search Report, Oct. 22, 2004.

* cited by examiner

Primary Examiner—Duane Smith
Assistant Examiner—Ives Wu
(74) Attorney, Agent, or Firm—Oral Caglar, Esq.

(57) ABSTRACT

The direct contact liquid air contaminant control system and method to revitalize air by removal of carbon dioxide and other trace gas contaminants use a direct contact air, liquid scrubber element and stripper element. The scrubber element has two rotor elements rotatably mounted in a housing first for centrifugal separation of an air flow and liquid absorbent mixture which liquid absorbent has absorbed carbon dioxide and trace gas contaminants. Then second for centrifugal separation of an air flow and acid water wash mixture which acid water wash has liquid absorbent and other contaminants. The processed air is then passed through a charcoal bed filter for further removal of contaminants. A rotary contact processor may also be used to reprocess contaminated liquid absorbent for reuse.

6 Claims, 3 Drawing Sheets

DIRECT CONTACT LIQUID AIR CONTAMINANT CONTROL SYSTEM

BACKGROUND OF THE INVENTION

This invention relates to an air environment control system that revitalizes air and more specifically to the apparatus that removes carbon dioxide and other trace gas contaminates as well as dehumidifies cabin air of aircraft and spacecraft. The new contaminant control system uses rotary fluid contact machines to scrub cabin air and to reprocess liquid absorbent and water for reuse while extracting carbon dioxide and other contaminants.

Liquid amine (methanol amine water solutions) based carbon dioxide and trace gas contaminant removal apparatus and processes for regeneration of air have been used in nuclear submarines for over forty years. Such systems are used to remove carbon dioxide for the breathing air and depend on gravity to process the liquid carbon amine or other liquids and air mixture.

An example of a combustion gas carbon dioxide process and apparatus is disclosed in U.S. Pat. No. 5,318,758. This type of gas process involves towers and other structures that depend on gravity, blowers and pumps to process the gas. Such systems are not simple or compact and do not work in reduced gravity environments such as on aircraft and spacecraft.

The use of alternative absorbent solutions has been disclosed in U.S. Pat. Nos. 4,285,918 and 3,632,519. These patents teach that water solutions of 3-amino-1,2 propanediol and ω-aminomethyl alkyl sulfone have improved performance for carbon dioxide removal in closed environments such as submarines. They address only the removal of carbon dioxide whereas there are a number of other contaminants that must be removed in these closed environments.

Centrifugal liquid and gas processors have been explored as described in the article "The Centrifugal Mass Exchange Apparatus in Air-Conditioning System of Isolated, Inhabited Object and Its Work Control", by P. A. Barabash, et al, in Proceedings of the $4^{th}$ European Symposium on Space Environmental and Control Systems, Oct. 21-24, 1991. The article postulates use of a centrifugal apparatus to work with an air-conditioning system in a closed habitat system such as an orbital space station. A single stage system is proposed that keeps air temperature and humidity parameters within limits. The single stage rotor does not anticipate a more staged air process system using contaminant absorbent fluids and acid wash to provide carbon dioxide and other contaminant removal from a cabin air environment.

As can be seen, there is a need for a simple, compact air regeneration system and method for use in aircraft and spacecraft.

SUMMARY OF THE INVENTION

An improved air contaminant control system and method according to the present invention comprises a carbon dioxide scrubber, a liquid absorbent stripper, a charcoal filter, and supporting containers, pumps and other elements.

In one aspect of the present invention, an air contaminant control system for removal of carbon dioxide and other trace contaminants from air comprises an absorber element for removal of air contaminants and a stripper element to recondition liquid absorbent that may be used in the absorber element. The air to be processed flows through the absorber element wherein liquid absorbent and an acid water wash are mixed with the air in a two step process for direct contact contaminant absorption and centrifugal removal of contaminants. The air flow is then passed through a charcoal bed filter and returned to the environment.

Another aspect of the present invention involves a method for removal of carbon dioxide and trace contaminants from an air stream comprising the steps of mixing the air stream with a liquid absorbent mist, separating the liquid absorbent from the air stream by centrifugal action that deposits the liquid absorbent on a rotating heat and mass transfer plate removal of the liquid through use of pitot pumps, removal of droplets in a mist separator or labyrinth collector; passing the air flow through a cold acid water wash to further remove contaminants and dehumidify the air flow; separating the acid water wash from the air stream by centrifugal action that deposits the acid water wash on a second heat and mass transfer plate, removal of the acid water wash through use of pitot pumps, removal of droplets in a mist separator or labyrinth collector; and passing the air flow through a charcoal bed filter. Additional stages similar to those described here may be used to achieve a desired air purification condition.

Another aspect of the present invention involves the method of liquid absorbent regeneration by thermal decomposition. The steps for this process involve heating the carbonate rich liquid absorbent to the decomposition temperature in a heater, spraying the heated liquid on to a rotating heat and mass transfer surface, separating the liquid absorbent from the evolved carbon dioxide gas through centrifugal action, removal of the carbonate lean liquid through the use of pitot pumps, and removal of droplets in a mist separator or labyrinth collector. The product gas may be further purified in a second stage to remove water and absorbent vapors, which contaminate the carbon dioxide. The method is comprised of the steps of washing the product gas by a spray of cold absorbent liquid that is then sprayed onto a rotating mass and heat transfer surface, separation of the liquid from the carbon dioxide through centrifugal action, removal of the liquid through the use of pitot pumps, and removal of droplets in a mist separator or labyrinth collector. More stages similar to the ones described here may be used to achieve the desired liquid absorbent regeneration and product carbon dioxide purity.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
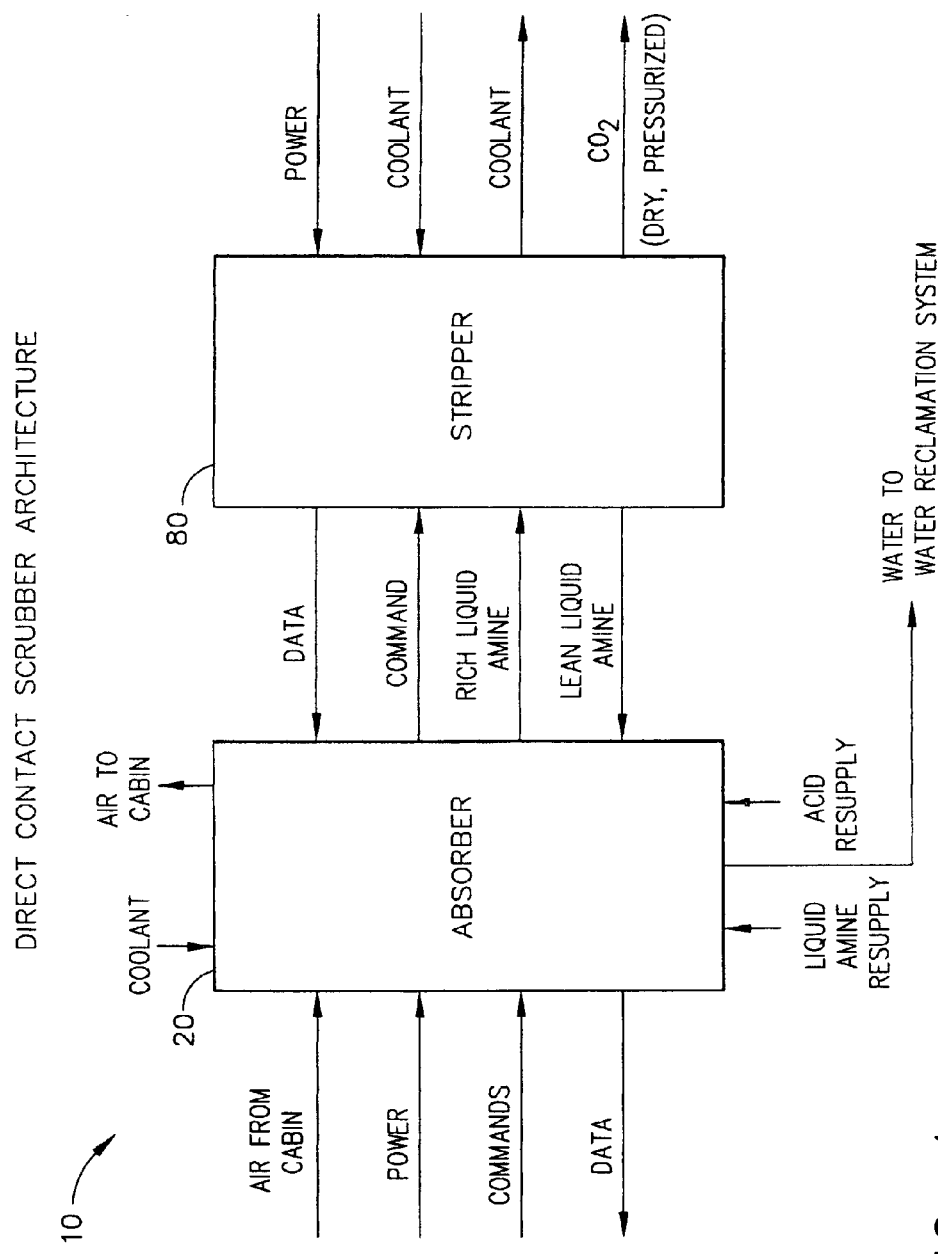
FIG. 1 illustrates a functional block diagram of the invention.
Figure 2:
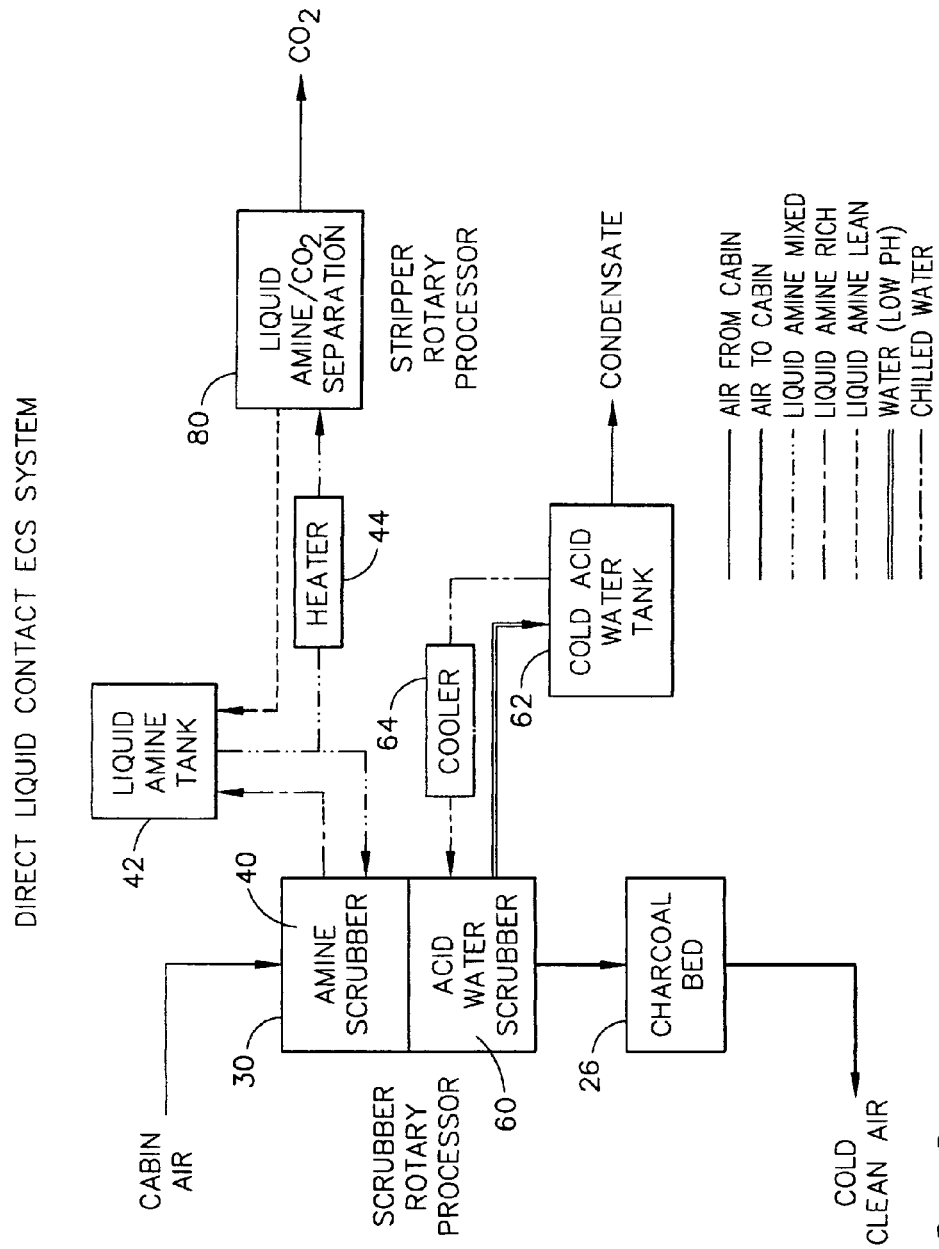
FIG. 2 illustrates a functional block diagram of the major elements according to an embodiment of the invention.

Referring to FIGS. 1 and 2, an air contaminant control system 10 has an absorber element 20 and a stripper element 80 in fluid communication and in control/data communication. Support elements such as a control and data processor and an electric power source, not shown, are provided by existing platform equipment as is found on spacecraft and aircraft. The air contaminant control system 10 may be connected to the cabin air system of a vehicle to process the return air from use in a vehicle human environment, to decontaminate and dehumidify the air, and to return cold clean air for use in a continuing cycle.

The current system absorber element 20 uses a rotary process scrubber 30 and charcoal bed filter 26 to remove contaminants. Both liquid absorbent (such as an amine) and acid water are used in the scrubber 30 for direct contact liquid/vapor phase separation of contaminants. The stripper 80 may also use a rotary processor for liquid/vapor phase separation of liquid absorbent and carbon dioxide. The use of rotary processors allows operation in variable gravity environments such as experienced in aircraft and spacecraft and provides compact, light weight and reliable apparatus as compared to current art bulky, inefficient apparatus. In addition, the use of direct contact liquid/vapor processing allows more efficient heat transfer as compared to current technology, which relies on use of condensing heat exchangers, slurpers, and rotating centrifugal phase separators. Acid water spray may be used in the air contaminant control system to remove absorbent vapor from the air and for temperature and humidity control. The acid water serves as an antimicrobial with the potential for reducing bacterial contamination or spread of pathogens.

Cabin air may be drawn through the scrubber 30 by a fan that may be used to aid vehicle cabin ventilation air flow. In the scrubber 30 carbon dioxide and other contaminates may be removed from the air through direct contact with a cool liquid absorbent. The liquid absorbent removes carbon dioxide to form a carbonate complex. The term liquid absorbent as commonly understood in the art relates to carbon dioxide liquid absorbents, as for example, water solutions of methanol amine, ethanol amine, isopropyl amine, cesium carbonate, magnesium carbonate and similar solutions. The choice of liquid absorbent may be based on system operational factors such as carbon dioxide pressure, temperature, humidity, regeneration temperature and energy sources.

The amines have a low vapor pressure at absorption conditions; however, without treatment some amine vapor may remain in the processed air to be introduced into the vehicle cabin as a contaminate. To inhibit this event an acid water scrubber 60 may be included in the scrubber 30 to maintain amine pressure at acceptable levels, for example, about 1 ppm. The same process may absorb other basic trace gases such as ammonia. A mild acid, such as, citric, acetic, or hypo-phosphoric acid, may reduce the amine vapor pressure to the desired levels. The water acid solution may become very diluted, but the pH should be maintained relatively low, i.e., greater than about 2 value. Additional acid may be added to the acid water scrubber 60 to maintain a low pH. For a fully closed system acetic acid, vinegar, may be produced onboard a vehicle using well known biological processes.

The carbon dioxide scrubber 40 may act to absorb acidic trace gases. The combination of the carbon dioxide scrubber 40 and acid water scrubber 60 results in substantial removal of water soluble trace gases. There may also be hydrocarbon trace gasses in the air that may not be absorbed in the scrubber 30. These gases may be removed by a charcoal bed filter 26 downstream of the scrubber 30. The charcoal bed filter 26 may be a single use or regenerable device depending on the mission requirements. Generally large portions of the trace contaminants are removed in the scrubber 30 thereby reducing the contaminant load to be processed by the charcoal bed filter 26. Such action may allow for a relatively small charcoal bed filter 26.

The acid water wash sprayed into the acid water scrubber 60 may act to control temperature and humidity by the use of a cold acid water wash in the temperature range of about 40 to 60° F. The cooling occurs due to direct thermal contact when cool acid water is sprayed into the air flow. The large surface area of the spray that may be effective for mass transfer may also be effective for heat transfer. Water vapor in the air may condense in the cold acid water spray and then be separated by the centrifugal action of the acid water scrubber 60 to adjust the humidity. The resultant dilute acid water may then be accumulated in acid water tank 62. As part of the process water may be removed from the acid water tank and acid may be added to maintain proper pH for reuse in the acid water scrubber 60. The removed dilute acid water may have salts and dissolved trace gasses. It may be processed in a water recovery system in the host vehicle for reuse in the water cycle. Processed acid water may be cooled at acid water cooler 64 and introduced to the acid water scrubber 60.

The carbon dioxide rich liquid absorbent solution may also be processed for reuse in the carbon dioxide scrubber 40. The liquid absorbent solution may be heated and processed through the stripper element 80 to separate carbon dioxide from the liquid absorbent solution. The carbonate complexes formed in the scrubber during the absorption of carbon dioxide are thermally unstable, for example, methanol amine carbonate decomposes at 270° F. Approximately five percent of the flow of liquid absorbent used to treat the air in the scrubber 30 may be heated in liquid absorbent heater 44 and introduced into the stripper 80. The stripper 80 may be a rotary contact processor similar to the rotary contact processor 32.

The stripper 80 permits evolution of the carbon dioxide and the separation of the liquid phase. The method for the process using a rotary contact processor comprises the steps of heating the carbonate rich liquid absorbent to its decomposition temperature in a flow through liquid absorbent heater, communicating the heated liquid absorbent into a first stage scrubber and spraying the heated liquid absorbent onto a rotating heat and mass transfer surface thereby separating the liquid absorbent from the evolved carbon dioxide gas through centrifugal acting, accumulating the carbonate liquid absorbent and removing it from the transfer surface using pitot pumps, and passing the carbon dioxide gas through a plurality of mist separators for removal of droplets prior to being output.

The carbon dioxide gas may be further processed by introduction into a second stage scrubber to remove water and absorbent vapors. The carbon dioxide gas may be washed by a spray of a cold liquid absorbent that may then be sprayed onto a rotating mass and heat transfer surface, the liquid absorbent separation from the carbon dioxide may be caused by centrifugal action, the liquid absorbent may then be accumulated and then removed by pitot pumps, and the carbon dioxide may be passed through a plurality of mist separators for removal of droplets prior to being output.

In each case of the liquid absorbent and the carbon dioxide processing, more process stages may be used to obtain desired absorbent regeneration and product carbon dioxide purity.

The liquid absorbent may be first processed by a stripper element 80 to remove carbonate complexes present in the solution. The heated liquid absorbent may be sprayed into the stripper element 80, which may be a rotary contact processor wherein the small droplets formed provide a large surface area permitting efficient carbon dioxide transfer. The pressure of the carbon dioxide may be controlled as for example by using a back-pressure regulating valve. Depending on the liquid absorbent used, the pressure can be set in the range of 40 to 70 psi. The rotary stripper element 80 centrifugal action functions to separate the liquid and gas phases similar to the scrubber 30.

The resultant carbon dioxide vapor may be hot and contain water vapor and absorbent vapor. The vapors are removed in a stripper element 80 by cooling the carbon dioxide and condensing the liquid. The cool liquid absorbent solution may be returned to the liquid absorbent tank 42 and the carbon dioxide may be compressed, dried and stored for further use or disposal.

Figure 3:
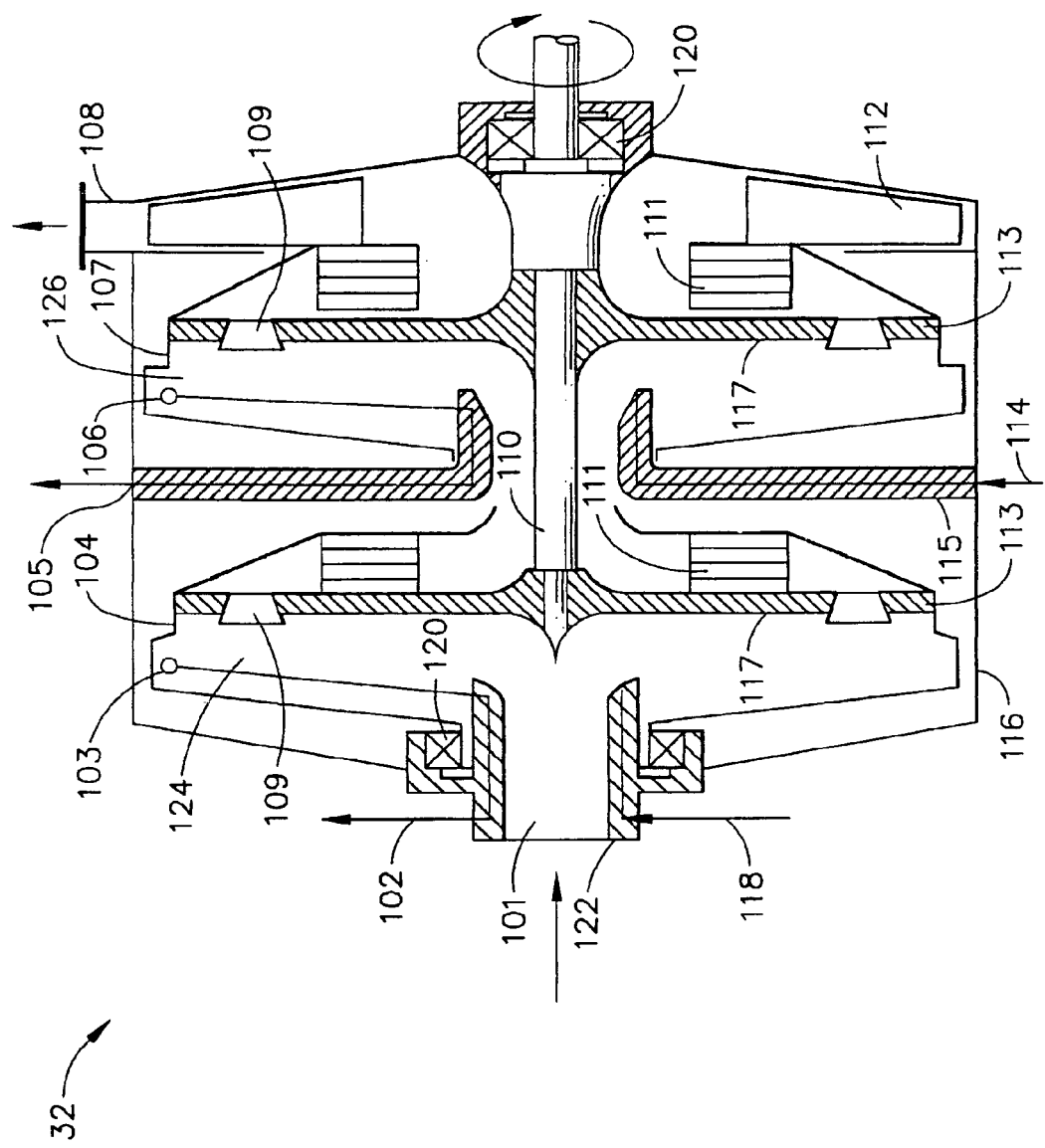
FIG. 3 illustrates a functional cross-sectional view of a rotary liquid contact processor apparatus according to an embodiment of the invention.

Referring to FIGS. 2 and 3, the scrubber 30 rotary contact processor 32 functions to provide direct liquid contact between air and two separate liquids, to separate the liquids and air, and to pump the liquids. The rotary contact processor 32 may be a dual rotor ambient pressure air scrubber that washes the air in the carbon dioxide scrubber rotor 104 with a carbon dioxide absorbant and washes the air with mild acid in the liquid absorbent scrubber rotor 107 as air flows through the device. It is supplied with a liquid absorbent solution, cooled acid wash water, atmospheric air, and electrical power. Electrical power is used for a drive motor, not shown. The advantage of this device is that it operates at atmospheric pressure, it is gravity independent and it provides a simple, rugged device.

The contact processor 32 consists of a rotor assembly comprised of carbon dioxide scrubber rotor 104 and liquid absorbent scrubber rotor 107 mounted in a housing 116 on bearings 120. Scrubbing and separation occur within the rotor. Liquid absorbent solution may be circulated through connections 102, 118 in the stationary hub 122 at one end and cooled acid wash water may be circulated through connections 105, 114 in a stationary baffle 115 located in the middle of the housing.

The two rotors 104, 107 are mounted on shaft 110 and are separated by stationary baffle 115. The first rotor 104 is in the carbon dioxide scrubber chamber 124 and may be used to remove carbon dioxide from the air stream. The second rotor 107 is in the acid wash scrubber chamber 126 and may be used to wash the air and to condense water from the air stream. Mist separators 111 and baffles 115 are used to isolate the two fluids. The air may be moved through the rotary contact processor 32 by a built-in fan 112. An external blower, not shown, may also be used.

The rotary contact processor 32 operates in the following manner: atmospheric air flows in the inlet 101 past the carbon dioxide scrubber rotor 104, through air passage tubes 109 and mist separators 111, past the liquid absorbent scrubber rotor 107, through second air passage tubes 109 and second mist separators 111, and through the fan 112, to the air exhaust 108. The fan 112 moves the air through the rotary contact processor 32 and the drive motor, not shown, keeps the rotors and fan moving at constant speed.

Carbon dioxide is removed from the air stream in the carbon dioxide scrubber chamber 124. Liquid absorbent enters at connection 118 and is sprayed into the air stream near the axis of rotation 128. It forms droplets and a thin layer on the carbon dioxide scrubber rotor 104 heat and mass transfer surface 117. The liquid flows by centrifugal action to the outside of the carbon dioxide scrubber chamber 124. This direct contact promotes the rapid absorption of carbon dioxide by the liquid absorbent. A mist separator 111 keeps liquid absorbent from entering the next chamber. The liquid absorbent forms a layer on the periphery of the chamber 124 and is pumped by the liquid absorbent pitot pump 103 through the liquid absorbent outlet 102 to an external liquid absorbent tank 42. The return liquid absorbent enters through liquid absorbent inlet 118.

The air is washed, cooled and humidity condensed in the acid wash scrubber chamber 126. Cold acid wash enters through the acid water wash inlet 114 and is sprayed into the air stream near the axis of rotation 128. It forms droplets and a thin layer on the liquid absorbent scrubber rotor 107 transfer surface 117. The liquid flows by centrifugal action to the outside of the acid wash scrubber chamber 126 and a portion of the humidity in the air stream condenses. The air stream is cooled below the dew point by the cold acid water wash. A mist separator 111 keeps water droplets from entering the exhaust stream at air exhaust 108. The condensate liquid forms a layer on the periphery of the chamber 126 and is pumped by the acid water pitot pump 106 through the acid water wash outlet 105 to the external circuit. The return cold acid water wash enters through the acid water wash inlet 114.

While one embodiment is described in terms of a two stage scrubber 30 having a carbon dioxide scrubber 40 and a liquid absorbent scrubber 60 having a common rotor shaft and housing, these two elements may also be contained in separate housings with fluid communication therebetween. In such an instance, the baffle 115 would be separated in structure such that the carbon dioxide scrubber 40 would have an outlet enclosed side and the liquid absorbent scrubber 60 would have an inlet enclosed side. Also, more than two stages may be used depending on the purity of the output desired by the user.

It should be understood, of course, that the foregoing relates to preferred embodiments of the invention and that modifications may be made without departing from the spirit and scope of the invention as set forth in the following claims.

I claim:

1. A gravity independent method for removal of carbon dioxide and other trace contaminants from air used in environmental control, comprising the steps of:

introducing an air flow into a carbon dioxide scrubber rotor and spraying a liquid absorbent mist into said air flow;

rotating said carbon dioxide scrubber rotor to accumulate and remove said liquid absorbent containing absorbed carbon dioxide and trace contaminants from the carbon dioxide scrubber rotor;

passing said airflow downstream of said carbon dioxide scrubber rotor through a plurality of first air passages and a plurality of first mist separators to a liquid absorbent scrubber rotor;

spraying a liquid acid wash into said air flow;

rotating said liquid absorbent scrubber rotor to accumulate and remove said liquid acid wash containing liquid absorbent, carbon dioxide and trace contaminants from the liquid adsorbent scrubber rotor; and passing air flow downstream of said liquid absorbent scrubber rotor through a fan to an air exhaust, whereby carbon dioxide and other trace contaminants may be removed from the airflow in variable gravity environments.

2. The method as in claim 1 wherein said extracted liquid absorbent is processed in a stripper element for reuse and wherein the pH of the accumulated acid wash is restored to a value of about 2 by addition of acetic acid.

3. A method for reconditioning a contaminated liquid absorbent in a gravity independent environmental control system, comprising the steps of:

heating a liquid absorbent containing a carbonate to a decomposition temperature in a liquid absorbent heater;

communicating said liquid absorbent into a scrubber;

spraying said liquid absorbent onto a rotating heat and mass transfer surface for separation of said liquid absorbent from an absorbed carbon dioxide;

accumulating said liquid absorbent for extraction from said scrubber by rotating the heat and mass transfer surface and removing the accumulated liquid absorbent from the scrubber with a pitot pump; and passing said carbon dioxide through a plurality of mist separators for output from said scrubber, whereby said reconditioning may be performed in variable gravity environments.

4. The method as in claim 3 further comprising the steps of:

communicating said carbon dioxide into a second scrubber;

washing said carbon dioxide using a spray of a cold liquid absorbent;

spraying said cold liquid absorbent onto a rotating second-scrubber mass and heat transfer surface for separation of said cold liquid absorbent from said carbon dioxide;

accumulating said cold liquid absorbent for extraction from said second scrubber by rotating the second-scrubber heat and mass transfer surface; and passing said carbon dioxide through a plurality of mist separators for output from said second scrubber.

5. The method as in claim 3 wherein said liquid absorbent is processed through a subsequent scrubber.

6. The method as in claim 4 wherein said cold liquid absorbent is processed through a subsequent scrubber.

* * * * *